(12) United States Patent
Hosek et al.

(10) Patent No.: US 12,090,645 B2
(45) Date of Patent: Sep. 17, 2024

(54) ROBOT FOR HIGH-TEMPERATURE APPLICATIONS

(71) Applicant: Persimmon Technologies Corporation, Wakefield, MA (US)

(72) Inventors: Martin Hosek, Salem, NH (US); Himanshu Shukla, Malden, MA (US); Tuan Ha, Randolph, MA (US)

(73) Assignee: Persimmon Technologies Corporation, Wakefield, MA (US)

(*) Notice: Subject to any disclaimer, the term of this patent is extended or adjusted under 35 U.S.C. 154(b) by 154 days.

(21) Appl. No.: 17/335,561

(22) Filed: Jun. 1, 2021

(65) Prior Publication Data

US 2021/0370528 A1    Dec. 2, 2021

Related U.S. Application Data

(60) Provisional application No. 63/031,883, filed on May 29, 2020.

(51) Int. Cl.
| | | |
|---|---|---|
| *B25J 17/00* | (2006.01) | |
| *B25J 9/04* | (2006.01) | |
| *B25J 11/00* | (2006.01) | |
| *B25J 19/00* | (2006.01) | |

(52) U.S. Cl.
CPC .............. *B25J 17/00* (2013.01); *B25J 9/042* (2013.01); *B25J 11/0095* (2013.01); *B25J 19/0054* (2013.01)

(58) Field of Classification Search
CPC ........ B25J 9/042; B25J 11/0095; B25J 17/00; B25J 19/0054
See application file for complete search history.

(56) References Cited

U.S. PATENT DOCUMENTS

| | | | | |
|---|---|---|---|---|
| 3,844,341 | A * | 10/1974 | Bimshas, Jr. ........... | F28D 11/02 165/104.34 |
| 4,584,045 | A * | 4/1986 | Richards ........... | H01L 21/67742 414/217 |
| 5,489,192 | A * | 2/1996 | Taniguchi ........ | H01L 21/67098 294/131 |
| 6,089,630 | A | 7/2000 | Watanabe | |
| 6,138,748 | A * | 10/2000 | Hamburgen ........ | H01L 23/3672 257/E23.09 |
| 6,183,026 | B1 | 2/2001 | Cai et al. | |
| 7,836,939 | B2 * | 11/2010 | Zimmerman ............. | F28F 5/00 165/104.19 |
| 10,424,498 | B2 | 9/2019 | Hofmeister et al. | |
| 10,541,167 | B2 | 1/2020 | Hofmeister et al. | |
| 10,569,430 | B2 | 2/2020 | Hosek et al. | |

(Continued)

*Primary Examiner* — William C Joyce
(74) *Attorney, Agent, or Firm* — Harrington & Smith

(57) ABSTRACT

An apparatus including a robot drive; and a robot arm connected to the robot drive, where the robot arm includes a first link connected to the robot drive, a second link rotatably connected to the first link at a first rotatable connection, and an end effector rotatably connected to the second link at a second rotatable connection. The end effector includes a heat choke located between a substrate support area of the end effector and the second rotatable connection. At least one of the first rotatable connector or the second rotatable connection includes a rotary thermal coupling having interleaved members which are rotatable relative to each other.

16 Claims, 12 Drawing Sheets

(56) References Cited

U.S. PATENT DOCUMENTS

| | | | |
|---|---|---|---|
| 2013/0071218 A1* | 3/2013 | Hosek | B25J 19/0054 |
| | | | 414/744.5 |
| 2014/0312640 A1 | 10/2014 | Yazawa et al. | |
| 2015/0327396 A1* | 11/2015 | Hahakura | B25J 9/044 |
| | | | 901/49 |
| 2016/0276142 A1 | 9/2016 | Lopp et al. | |

* cited by examiner

ROBOT FOR HIGH-TEMPERATURE APPLICATIONS

CROSS REFERENCE TO RELATED APPLICATION

This application claims priority under 35 USC 119(e) to U.S. provisional patent application No. 63/031,883 filed May 29, 2020, which is hereby incorporated by reference in its entirety.

BACKGROUND

Technical Field

The example and non-limiting embodiments relate generally to a robot capable of handling hot payloads and suitable for operation in high-temperature environments, such as in a semiconductor wafer processing system for example.

Brief Description of Prior Developments

U.S. Pat. No. 10,569,430, which is hereby incorporated by reference in its entirety, discloses heat transfer in a robot drive and an arm. U.S. Pat. No. 10,424,498, which is hereby incorporated by reference in its entirety, discloses a service loop to provide coolant. U.S. Pat. No. 10,541,167, which is hereby incorporated by reference in its entirety, discloses heat transfer.

SUMMARY

The following summary is merely intended to be an example. The summary is not intended to limit the scope of the claims.

In accordance with one aspect, an example apparatus may be provided comprising: a robot drive; and an robot arm connected to the robot drive, where the robot arm comprises a first link connected to the robot drive, a second link rotatably connected to the first link at a first rotatable connection, and an end effector rotatably connected to the second link at a second rotatable connection, where the end effector comprises a heat choke located between a substrate support area of the end effector and the second rotatable connection, and where at least one of the first rotatable connector or the second rotatable connection comprises a rotary thermal coupling having interleaved members which are rotatable relative to each other.

In accordance with another aspect, an example apparatus may be provided comprising: a robot drive; and a robot arm connected to the robot drive, where the robot arm comprises a first link connected to the robot drive, a second link rotatably connected to the first link at a first rotatable connection, and at least one third link rotatably connected to the second link at at least one second rotatable connection, where the at least one third link comprises a heat choke located between a substrate support area of the at least one third link and the second rotatable connection, and where at least one of the first rotatable connector or the second rotatable connection comprises a rotary thermal coupling having interleaved members which are rotatable relative to each other.

In accordance with another aspect, an example method may be provided comprising: providing an end effector comprising a heat choke located between a first end of the end effector having a substrate support area and an opposite second end of the end effector; connecting the second end of the end effector to a link at a rotary connection, where the link and the end effector are configured to at least partially form an arm of substrate transport robot, where the connecting of the second end of the end effector to the link comprises providing a rotary thermal coupling having interleaved members which are rotatable relative to each other at the rotary connection.

In accordance with another aspect, an example method method may be provided comprising: moving a robot arm to locate a substrate on an end effector of the robot arm, where the robot arm comprises a first link connected to a robot drive, a second link rotatably connected to the first link at a first rotatable connection, and the end effector rotatably connected to the second link at a second rotatable connection, where the end effector comprises a heat choke located between a substrate support area of the end effector and the second rotatable connection, and where the second rotatable connection comprises a rotary thermal coupling having interleaved members which are rotatable relative to each other; and transferring heat from the robot arm and out of the robot drive, where the heat choke assists to decrease heat from the substrate support area to be transferred to the second link and the second rotatable connection, and where the rotary thermal coupling at the second rotatable connection assists to increase heat transfer from the end effector to the second link.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1A:
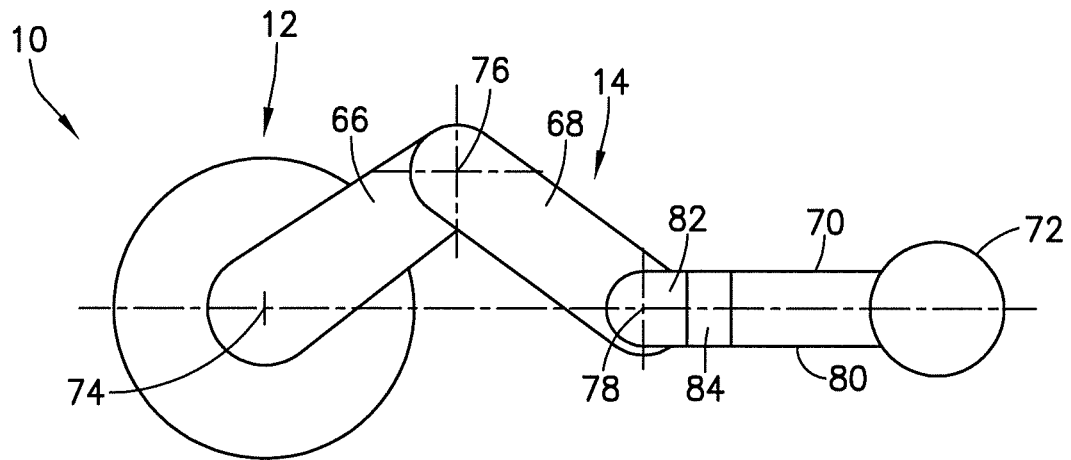
FIG. 1A is a top view of robot comprising features as described herein.
Figure 1B:
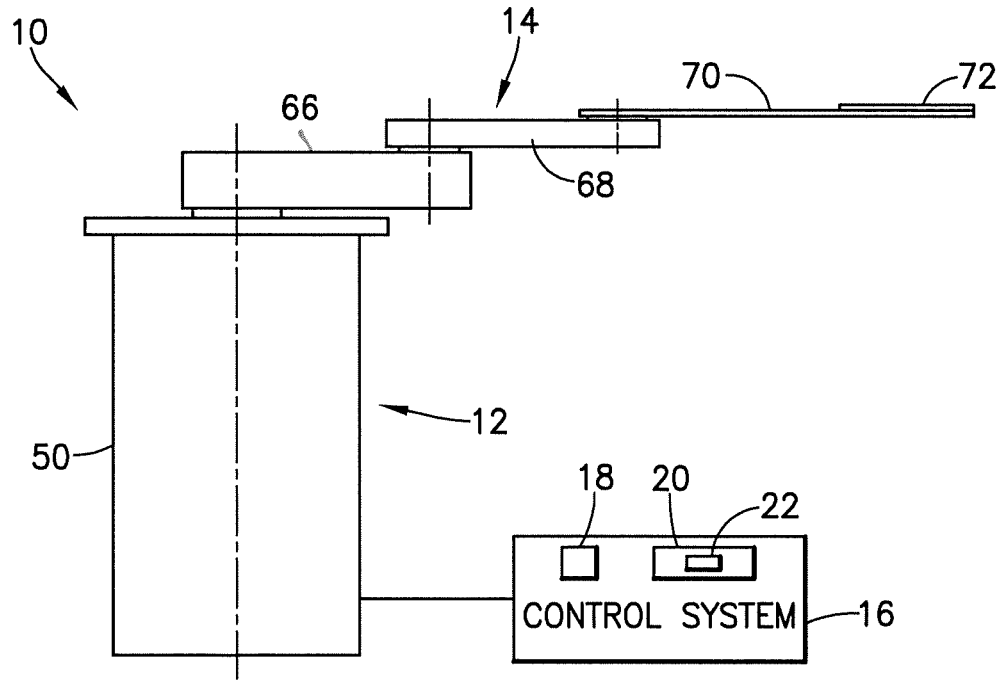
FIG. 1B is a side view of the robot shown in FIG. 1A.

Referring to FIGS. 1A-1B, there is shown a top plan view and side view of an apparatus 10 incorporating features of an example embodiment. Although the features will be described with reference to the example embodiment shown in the drawings, it should be understood that features can be embodied in many alternate forms of embodiments. In addition, any suitable size, shape or type of elements or materials could be used.

In the example embodiment of FIGS. 1A-1B, the apparatus is a robot comprising a drive unit 12, a robot arm 14 and a control system 16. The control system 16 may comprise at least one processor 18 and at least one memory 20 comprising software or code 22. The control system is configured to control movement of motors in the drive unit (and perhaps in the arm 14) and receive signals from sensors such as in the drive unit 12, and/or the arm 14, and/or external to the robot 10. A simplified cross-sectional view of the example embodiment of the robot 10 is provided in a diagrammatic form in FIG. 2.

Figure 2:
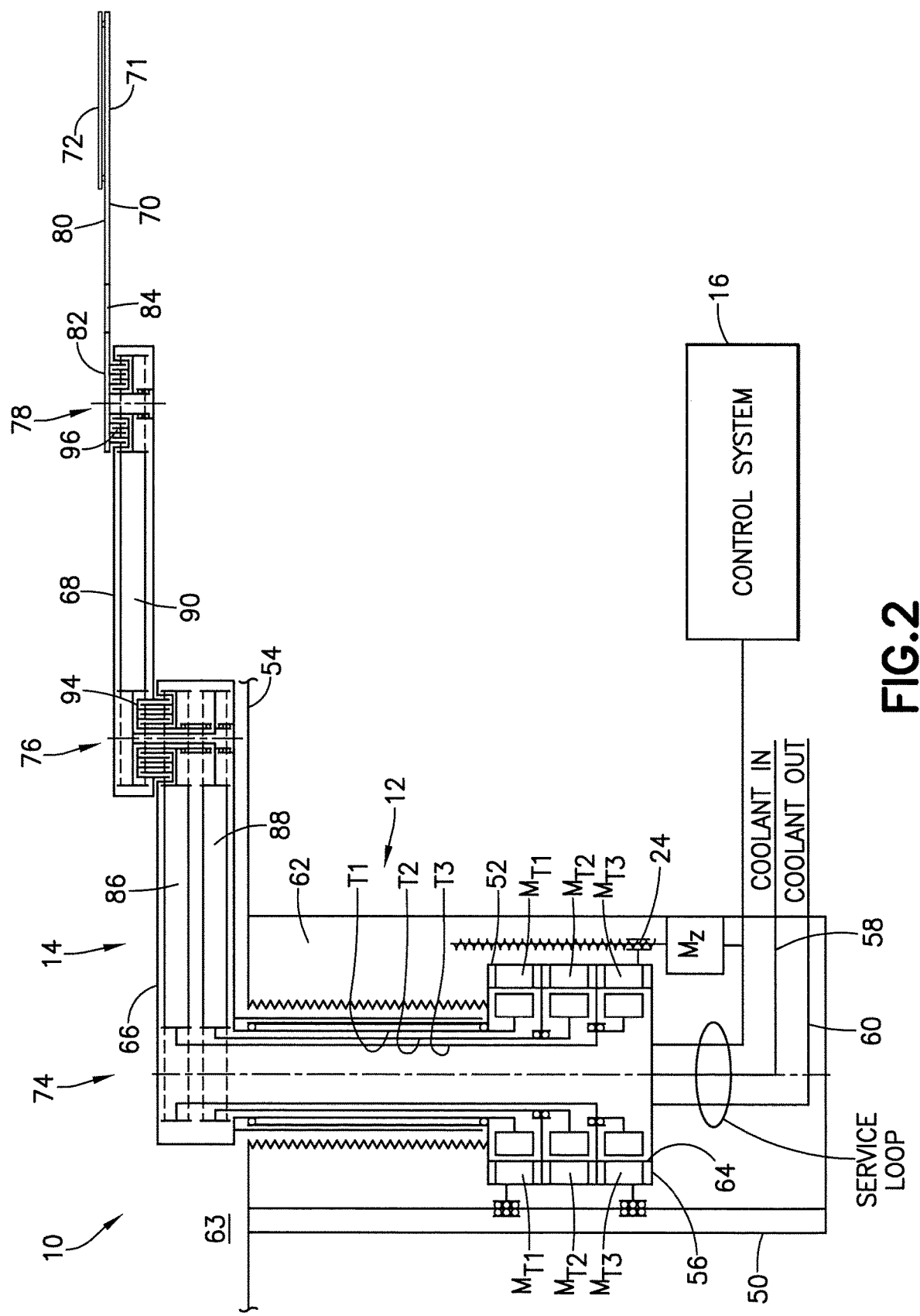
FIG. 2 is a schematic sectional view of the robot shown in FIGS. 1A-1B.

Referring also to FIG. 2, in the example shown, the drive unit 12 comprises a housing 50 which may be stationarily attached to a wall 54 of a substrate transport chamber and a spindle assembly 52 located inside the housing 50 which is configured to at least partially actuate the robot arm 14. The spindle assembly 52, in this example, comprises a spindle housing 56, one or more motors and one or more drive shafts. In the example shown in FIG. 3, the spindle assembly 52 comprises three motors $M_{T1}$, $M_{T2}$, $M_{T3}$ and three drive shafts T1, T2, T3. However, in alternate examples, more of less than three motors and shafts may be provided. The stators of the motors may be attached to the spindle housing 56, and the rotors of the motors may be attached to the drive shafts T1, T2, T3. In the example of FIG. 2, the three shafts T1, T2, T3 are coaxial drive-shafts. The outer shaft is shaft T1, the shaft between the outer shaft and the inner shaft is shaft T2, and the inner shaft is shaft T3.

In this example, the drive unit further comprises a vertical lift mechanism 24. For example, the vertical lift mechanism 24 may comprise one or more linear rail-bearing arrangements and a motor-driven ball-screw, configured to lift the spindle assembly 52 up and down in the vertical directions.

As indicated in FIG. 2, the spindle housing (and/or the optional neck that may support shaft T1) may be liquid-cooled as indicated by the coolant in conduit 58 and the coolant out conduit 60. If the drive unit features the vertical lift mechanism 24, the liquid coolant may be channeled in and out of the spindle housing via a service loop, such as along with electrical connections and conductors associated with operation of the spindle motors for example.

As another example, which may be particularly convenient when the drive unit features a vertical lift mechanism, the frame of the robot may be liquid cooled, such as the housing frame 50 for example, and heat may transferred from the spindle housing 56 to the frame 50 of the drive unit via radiation as well as conduction and convection through the atmospheric environment 62 between the spindle housing 56 and the frame 50 of the drive unit. In this case, the effective area available for heat transfer may be desirably increased by utilizing one or more interleaving vertical fins on the spindle housing 56 and the frame 50 of the drive unit. This arrangement may allow for vertical motion of the spindle housing 56 with respect to the frame 50 of the robot drive unit, and it may not require the liquid coolant to be channeled through a service loop.

Alternatively, conventional forced-air cooling of the spindle housing, which is typical in the state-of-the-art robots, may be employed.

Considering that the robot arm 14 may operate in a vacuum environment inside the substrate transport chamber, the spindle assembly 52 of the drive unit may include sealing and other features that may allow shafts T1, T2 and T3 or upper portions of shafts T1, T2 and T3 to be in a vacuum environment. As an example, a substantially cylindrical separation barrier 64 between the rotors of the motors and the stators of the motors may be utilized to contain an atmospheric environment on the stator side (outer side) of the separation barrier and a vacuum environment on the rotor side (inner side) of the separation barrier, in which case shafts T1, T2 and T3 may reside in a vacuum environment in their entirety. As another example, rotary seals, such as ferrofluidic seals, may be utilized to allow upper portions of shafts T1, T2 and T3 to protrude from an atmospheric environment 62 to a vacuum environment 63.

The robot arm 14 may include one or more links that may be coupled to each other by suitable mechanical couplings. In the example of FIG. 2, three links 66, 68, 70 are coupled to each other via rotary joints are shown. The third link 70 comprises an end effector with a substrate support area 71 configured to support a payload 72, such as a semiconductor substrate for example, thereon.

The following terminology is used throughout the document:

The first link 66 of the example robot arm is referred to as link 1 or the upper arm, the second link 68 is referred to link 2 or the forearm, and the third link 70 is referred to as link 3 or end effector.

The rotary joint 74 between the spindle assembly 52 and link 1 is referred to as the shoulder joint, the rotary joint 76 between link 1 and link 2 is referred to as the elbow joint, and the rotary joint 78 between link 2 and link 3 is referred to as the wrist joint.

Link 3 may be configured to carry a payload 72. As an example, it may include an end-effector suitable to pick, carry and place a semiconductor wafer.

Link 3 may consist of a first portion (portion 1) 80 adjacent to a payload, a second portion (portion 2) 82 adjacent to the wrist joint, and a heat choke 84 between the two portions 80, 82 of link 3. The heat choke 84 may be configured to limit heat transfer from the first portion 80 of link 3 to the second portion 82 of link 3. The amount of the heat transferred through the heat choke 84 may be controlled by its thermal resistance, which may be selected along with other design parameters to achieve the desired balance between the temperature of the first portion 80 of link 3 and the second portion 82 of link 3. The heat choke 84 may be implemented, for instance, in the form of a section of material with low thermal conductivity, such as a ceramic. The heat choke may comprise a refractory material. A refractory material, or refractory, is a material that is resistant to decomposition by heat, pressure, or chemical attack, and retains strength and form at high temperatures. Refractories are generally polycrystalline, polyphase, inorganic, nonmetallic, porous, and heterogeneous. They are typically composed of oxides or non-oxides such as carbides, nitrides, etc. such as of the following materials for example: silicon, aluminum, magnesium, calcium, and zirconium. Some metals with melting points >1850° C. such as niobium, chromium, zirconium, tungsten, rhenium, tantalum, etc. might also be considered as refractories.

As indicated in FIG. 2, link 1 (upper arm) 66 may be connected to drive shaft T1. Link 2 (forearm) 68 may be coupled to link 1 via the rotary joint (elbow joint) 76 and actuated by shaft T3 using a transmission arrangement. The transmission arrangement may comprise a first shoulder pulley, which may be attached to shaft T3, first elbow pulley, which may be attached to link 2, and a band, belt or cable 86 which may transmit motion between the two pulleys.

Link 3 may be coupled to link 2 via another rotary joint (wrist joint) and actuated via a two-stage transmission arrangement. The first stage of the transmission arrangement may comprise a second shoulder pulley, second elbow pulley and a band, belt or cable 88 which may transmit motion between the two pulleys. The second stage of the transmission arrangement may comprise a third elbow pulley, wrist pulley and another band, belt or cable 90 which may transmit motion between the two pulleys. As shown in FIG. 2, the second shoulder pulley may be attached to shaft T2, the second elbow pulley may be connected to the third elbow pulley, and the wrist pulley may be attached to link 3

One or more of the mechanical couplings in the robot arm may be complemented by one or more thermal couplings configured to transfer heat between the links connected by the corresponding mechanical coupling. Referring again to the example of FIG. 2, each of the rotary joints, namely the shoulder joint 74, the elbow joint 76 and the wrist joint 78, of this particular example arm is complemented by a rotary thermal coupling 92, 94, 96 respectively.

Figure 3A:
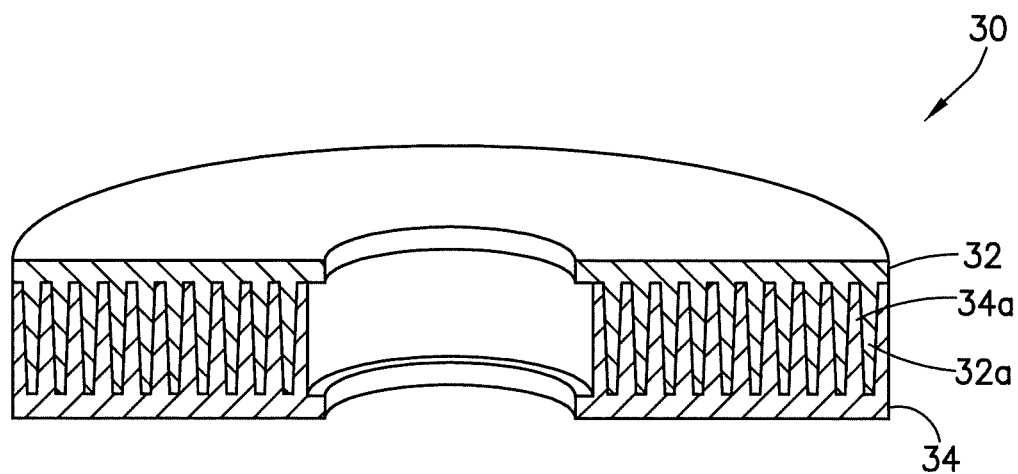
FIG. 3A is a schematic sectional view of an example rotary thermal coupling.

As shown in FIG. 3A, an example rotary thermal coupling 30 may comprise two portions 32, 34, each featuring one or more substantially cylindrical surfaces aligned coaxially with the corresponding rotary joint and arranged so that a cylindrical surface on one portion of the thermal coupling faces an opposing cylindrical surface on the other portion of the thermal coupling. A small gap is provided between the portions such that the surfaces do not touch one another. The opposing cylindrical surfaces may be configured to transfer heat via radiation across the gap between the opposing substantially cylindrical surfaces of the rotary thermal coupling. The radiation mechanism may be supplemented by convection/conduction through the environment between the opposing substantially cylindrical surfaces of the rotary thermal power coupling if residual gasses are present in the environment.

As illustrated in the example of FIG. 3A, in order to increase the effective area and minimize the volume occupied by the example rotary thermal coupling, an array of substantially cylindrical features 32a, 34a may be provided on each of the two portions of the rotary thermal coupling, and the two arrays may be arranged in an interleaving manner.

Figure 3B:
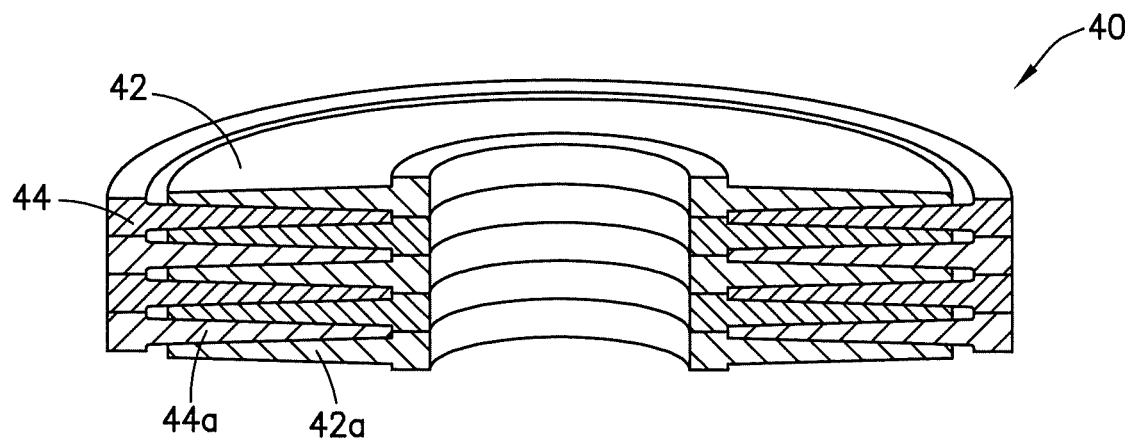
FIG. 3B is a schematic sectional view of another example of a rotary thermal coupling.

Alternatively, as depicted in the example of FIG. 3B, the two portions 42, 44 of the rotary thermal coupling may provide opposing disk-shaped features 42a, 44a configured for contactless heat transfer across the gap between them. As another alternative, any other suitable shapes of the effective features of the rotary thermal coupling, including but not limited to conical and spherical shapes, and their combination may be utilized.

The effective surfaces of the rotary thermal coupling may be treated to improve their thermal emissivity. For example, the two portions of the rotary thermal coupling may be made of aluminum and the effective surfaces may be anodized.

In order for the example rotary thermal coupling to facilitate heat transfer between two links of a robot arm, one portion of the example rotary power coupling may be attached to one link and the other portion of the example rotary power coupling may be attached to a neighboring link in an arrangement substantially coaxial with the rotary joint connecting the two links. Alternatively, the features of the rotary thermal coupling may be incorporated directly into the links of the robot arm.

The links of the robot arm may be made of a material with a high thermal conductivity, such as an aluminum alloy or stainless steel for example. If the links of the robot arm are made of a material with a high thermal conductivity, the temperature gradient (difference) between the joints of each of the links may be viewed as negligible. If one or more of the links of the robot arm is long, the cross-sectional area of one or more of the links of the robot arm may be small and/or if the material of one or more of the links of the robot arm does not provide adequate thermal conductivity, the heat transfer through such one or more links of the robot arm may be improved by the use of one or more heat pipes, as depicted diagrammatically in FIG. 3C.

A heat pipe is a heat-transfer device that combines the principles of thermal conductivity and phase transition to transfer heat between two thermally conductive interfaces. It may consist of a sealed tube-like enclosure with a hot interface at one end and a cold interface at the other end, a wick structure and a working fluid. The principle of operation of a heat pipe can be described as follows: at the hot interface, the working fluid in a liquid state contacts the thermally conductive hot interface and turns into a vapor by absorbing heat from the hot interface. The vapor then travels along the heat pipe to the cold interface where it condenses back into a liquid state, releasing latent heat. This process results in a high effective thermal conductivity between the hot and cold interfaces of the heat pipe.

Figure 3C:
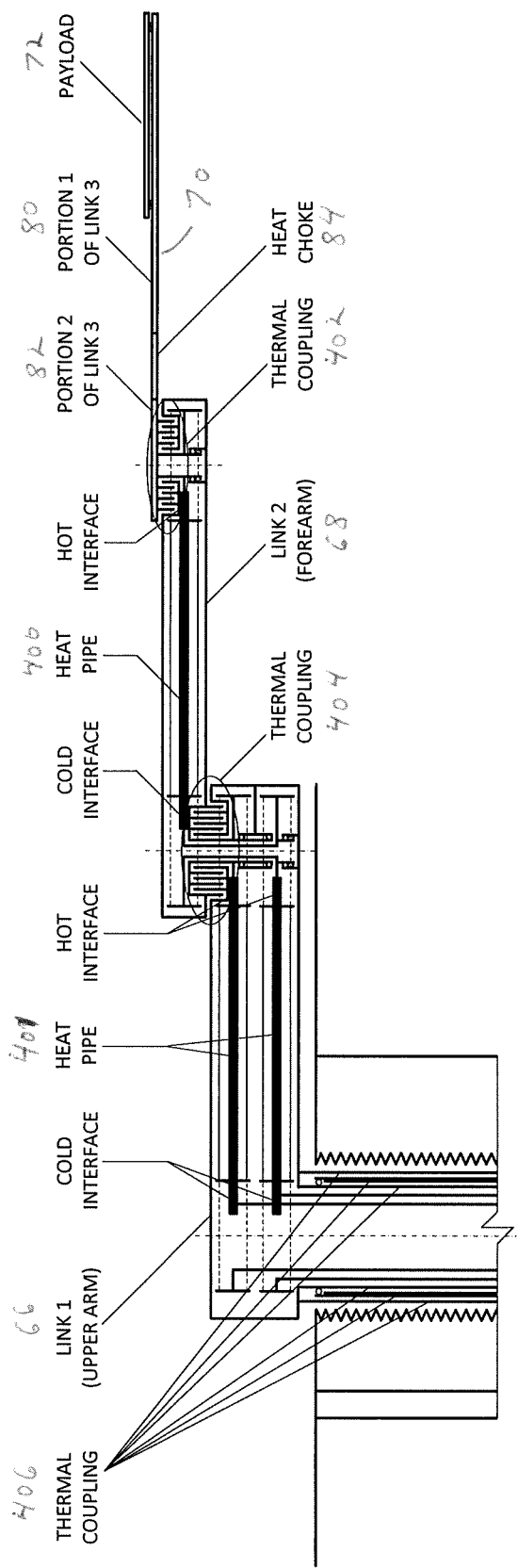
FIG. 3C is a schematic diagram illustrating an example embodiment including a heat choke, heat pipes and thermal couplings at joints.

For instance, as illustrated diagrammatically in FIG. 3C, one or more heat pipes 400, 401 may be utilized to facilitate or complement heat transfer through the forearm (link 2), for example, from a rotary thermal coupling 402 at the wrist joint to a rotary thermal coupling 404 at the elbow joint. Similarly, as also shown diagrammatically in FIG. 3C, one or more heat pipes 401 may be configured to transfer heat through the upper arm (link 1), for example, from the rotary thermal coupling 404 at the elbow joint to a rotary thermal coupling 406 at the shoulder joint.

The hot and cold interfaces (hot and cold ends) of the heat pipe(s) 400, 401 may be mechanically and thermally connected to the links of the robot arm or to the rotary thermal couplings of the robot arm with minimum heat resistance. As an example, clamping, gluing, potting, soldering or brazing may be used for this purpose. With features as described herein, an example embodiment may be provided with comprises one or more heat chokes and one or more heat pipes. For example, one or more heat chokes may be provided at the end effector link of the robot arm and a heat pipe may be provided behind that heat choke(s), such as at or between any of the other links, the joints and/or drive, or perhaps in at least part of the end effector. For example, referring to FIG. 1A, the one or more heat pipes could be provided at part of the end effector 70 (between the heat choke 84 and the joint 78), at the link 68, at the link 66 and/or at the drive 50. Thus, the combination of both a heat choke and a heat pipe may be used to help control heat transfer in the robot arm. In one example embodiment the apparatus may comprise merely one or more heat pipes without use of a heat choke. In another example a heat transfer device rather than a heat pipe might be used to assist in accelerating heat transfer from one portion of the robot arm towards an area spaced from the end effector and perhaps out of the robot arm.

Figure 4:
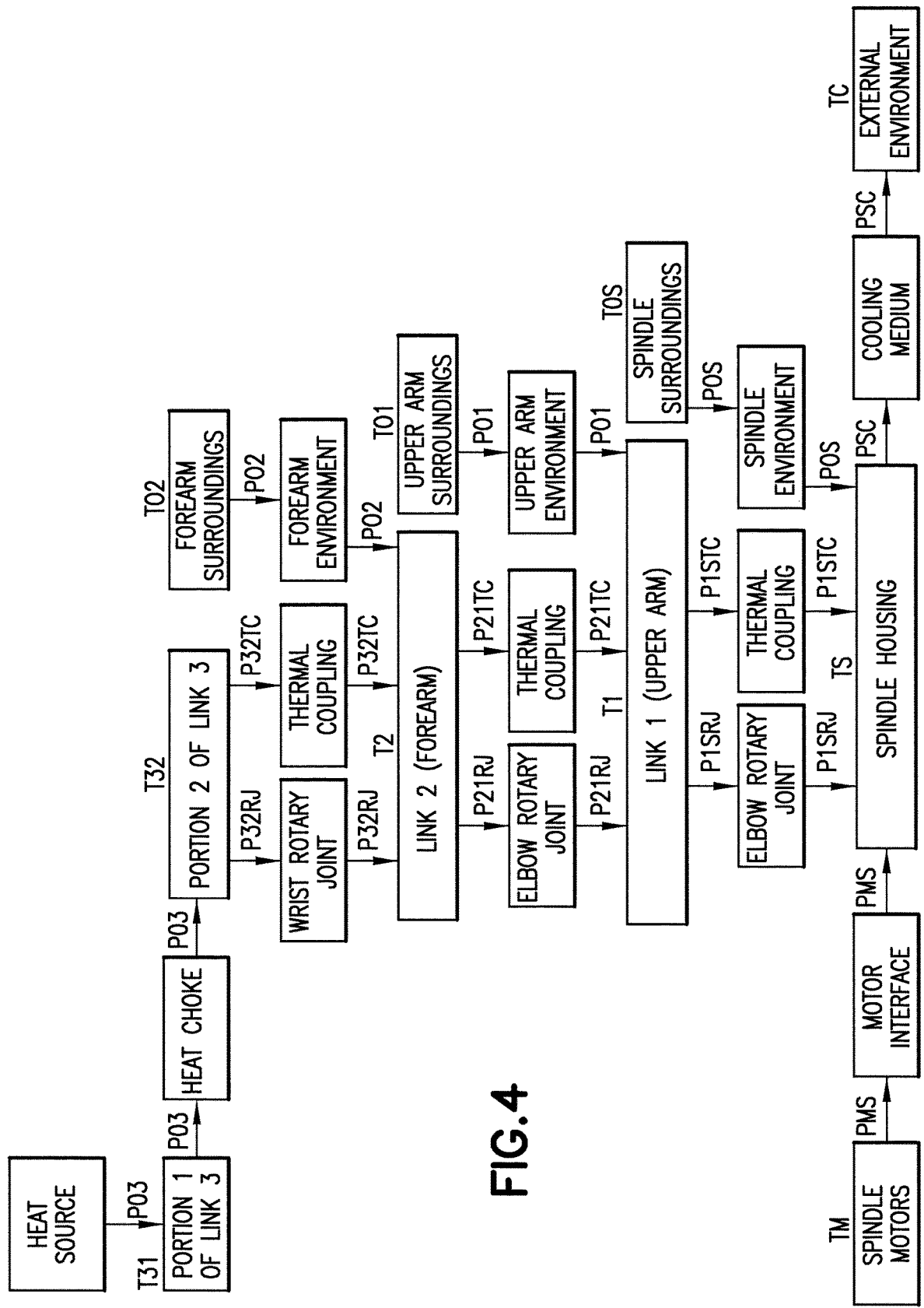
FIG. 4 is a block diagram of a simplified thermal model of the example robot shown in FIGS. 1A-2.

A simplified thermal model of the example robot is depicted in the block diagram of FIG. 4. The following nomenclature is used in the figure and throughout the text (in alphabetical order):

A1—external surface area of link 1 (upper arm) (m2)
A1S—effective area of shoulder joint thermal coupling (m2)
A2—external surface area of link 2 (forearm) (m2)
A21—effective area of elbow joint thermal coupling (m2)
A3—external surface area of first portion of link 3 (m2)
A32—effective area of wrist joint thermal coupling (m2)
AS—external surface area of spindle housing (m2)
FC—flow of spindle housing cooling medium (l/min)
P—robot arm environment pressure (Torr)
P01—heat transmitted from surrounding environment to link 1 (W)
P02—heat transmitted from surrounding environment to link 2 (W)
P03—heat transmitted from payload and surrounding environment to link 3 (W)
P1SRJ—heat transmitted from link 1 to spindle housing through rotary joint (W)
P1STC—heat transmitted from link 1 to spindle housing through thermal coupling (W)
P21RJ—heat transmitted from link 2 to link 1 through rotary joint (W)
P21TC—heat transmitted from link 2 to link 1 through thermal coupling (W)
P32RJ—heat transmitted from link 3 to link 2 through rotary joint (W)
P32TC—heat transmitted from link 3 to link 2 through thermal coupling (W)
P0S—heat transmitted from surrounding environment to spindle housing (W)
PM—heat produced by spindle motors (W)
PMS—heat transmitted from spindle motors to spindle housing (W)
PSC—heat transmitted from spindle housing to cooling medium (W)
T01—temperature of link 1 surroundings (deg C.)
T02—temperature of link 2 surroundings (deg C.)
T03—temperature of surroundings of first portion of link 3 (deg C.)
T0S—temperature of spindle surroundings (deg C.)
T1—temperature of link 1 (upper arm) (deg C.)
T2—temperature of link 2 (forearm) (deg C.)
T31—temperature of first portion of link 3 (between payload and heat choke) (deg C.)
T32—temperature of second portion of link 3 (between heat choke and wrist joint) (deg C.)
TC—inlet temperature of spindle housing cooling medium (deg C.)
TERA—thermal emissivity of external surfaces of robot arm links
TETC—Thermal emissivity of effective surfaces of thermal couplings
TM—temperature of spindle motors (deg C.)
TS—temperature of spindle housing (deg C.)

As shown in FIG. 4, major components of the robot, including the spindle housing, link 1 (upper arm), link 2 (forearm), first portion of link 3 (between the payload and the heat choke) and second portion of link 3 (between the heat choke and the wrist joint), are represented by discrete lumped thermal masses in the thermal model.

Considering that the example robot is expected to handle hot payloads and operate in high-temperature environments, it is assumed that heat may be transferred to link 3 from a payload and from the environment the payload may be picked from or placed to (this is represented by the HEAT SOURCE block in FIG. 4; for thermal modeling purposes, the heat source may be characterized by temperature T03, as defined above). As indicated in FIG. 4, it is also assumed that heat may be transferred to link 1 and link 2 from their surroundings. The heat transfer mechanisms may include radiation from the surroundings as well as convection/conduction if residual gasses are present in the environment. Similarly, as shown in FIG. 4, the spindle housing may receive heat from the spindle motors, and it may receive heat through from the surrounding atmospheric environment and other surroundings.

In the example of FIG. 4, it is assumed that heat is removed from the robot by the means of liquid cooling of the spindle housing.

Example thermal model parameters and inputs are listed in Table 1. As an example, the parameters may represent a material-handling robot in a vacuum-environment semiconductor wafer processing system.

TABLE 1

| Symbol | Description | Value |
|---|---|---|
| A1 | External surface area of link 1 (upper arm) | 0.40 m² |
| A1S | Effective area of shoulder joint thermal coupling | 0.40 m² |
| A2 | External surface area of link 2 (forearm) | 0.35 m² |
| A21 | Effective area of elbow joint thermal coupling | 0.25 m² |
| A3 | External surface area of first portion of link 3 | 0.15 m² |
| A32 | Effective area of wrist joint thermal coupling | 0.15 m² |
| AS | External surface area of spindle housing | 0.10 m² |
| FC | Flow of spindle housing cooling medium | 2.8 l/min |
| p | Robot arm environment pressure | $2 \times 10^{-5}$ Torr |
| TM | Heat produced by spindle motors | 500 W |
| T01 | Temperature of link 1 surroundings | 200 deg C. |
| T02 | Temperature of link 2 surroundings | 200 deg C. |
| T03 | Temperature of surroundings of first portion of link 3 | 400 deg C. |
| T0S | Temperature of spindle surroundings | 20 deg C. |
| TC | Temperature of spindle housing cooling medium | 20 deg C. |
| TERA | Thermal emissivity of external surfaces of robot arm links | 0.05 |
| TETC | Thermal emissivity of effective surfaces of thermal couplings | 0.87 |

As indicated in Table 1, the temperature of the surroundings of the first portion of link 3 has been selected as 400 deg C., which may represent, for instance, the temperature of a wafer carried by the robot and/or the temperature of a process module where a wafer may be picked from or placed to. The temperatures of the surroundings of link 1 and link 2 have been selected as 200 deg C., which may represent, for example, the temperature of the walls of the vacuum transfer chamber where the robot arm operates. The spindle housing is assumed to be water cooled with inlet temperature of 20 deg C. and flow of 2.8 l/min, as also indicated in Table 1.

Figure 5:
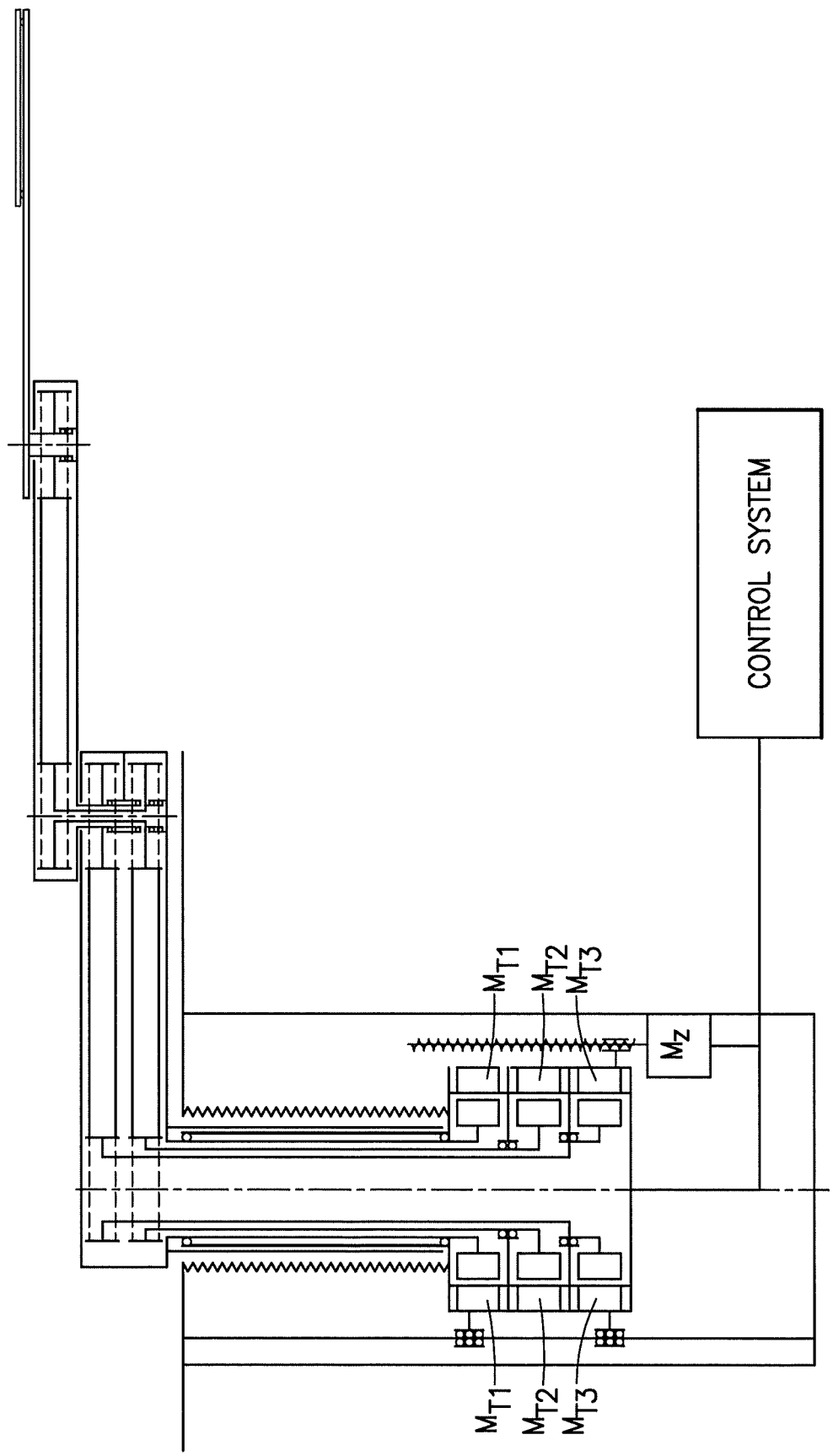
FIG. 5 is schematic sectional view similar to FIG. 2 of a conventional robot.

For comparison, an equivalent state-of-the-art conventional robot is depicted diagrammatically in FIG. 5. As indicated in the figure, link 3 of the robot arm does not feature a heat choke, rotary thermal couplings are not present, although some heat may still be transmitted through the rotary joints themselves, and the spindle housing is air cooled.

Figure 6:
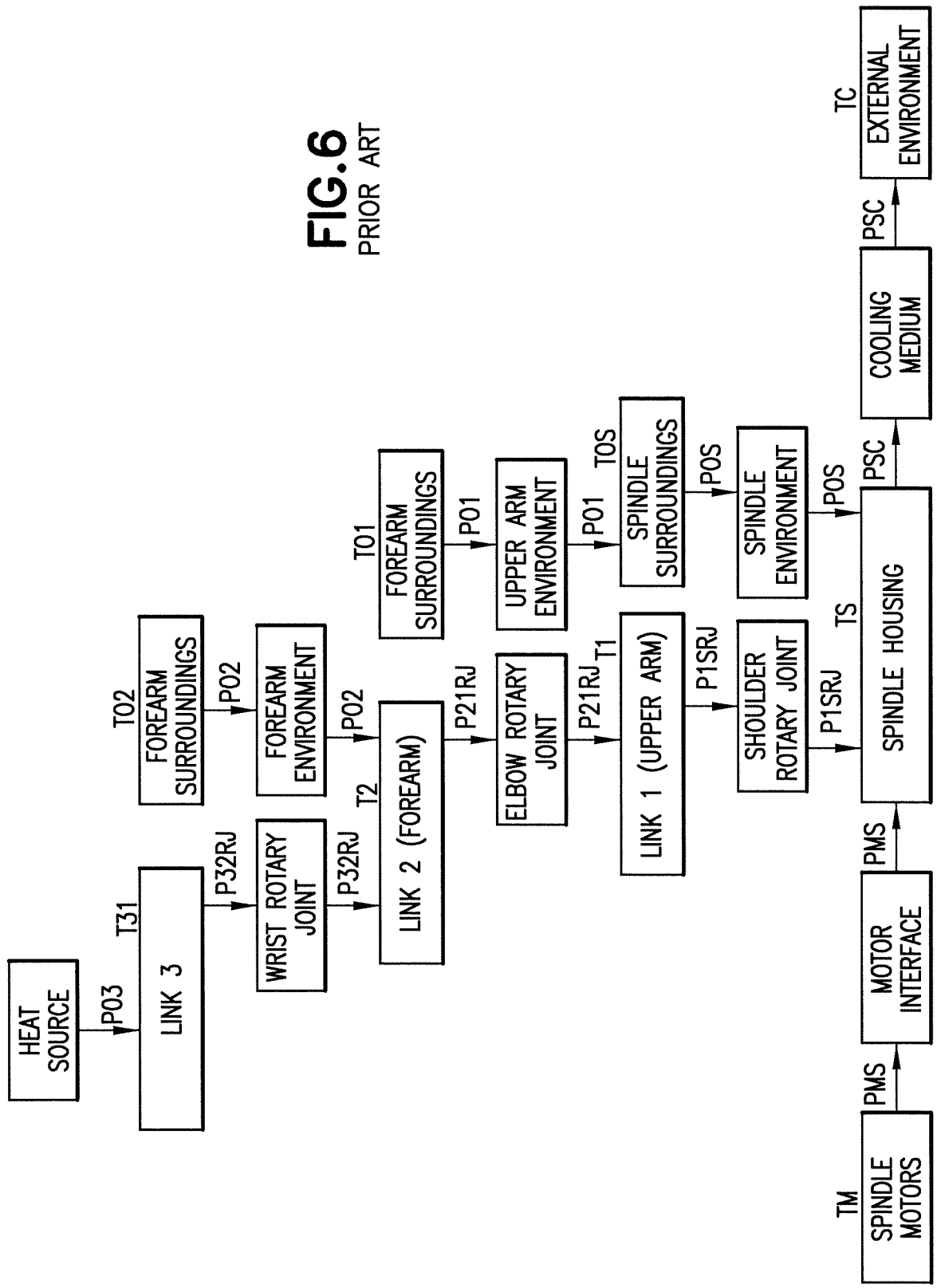
FIG. 6 is a block diagram of a simplified thermal model of the robot shown in FIG. 5.

A simplified thermal model of the equivalent state-of-the-art conventional robot of FIG. 5 is illustrated in the block diagram of FIG. 6. Since link 3 does not feature a heat choke, it is represented by a single thermal mass in the thermal model, rotary thermal couplings are not present in the thermal model and forced-air cooling of the spindle housing is considered in the thermal model.

For comparison purposes, the same thermal model parameters and inputs are used. The results of the thermal performance comparison are presented in Table 2.

TABLE 2

| Symbol | Description | Robot According to Present Invention | State-of-the Art Conventional Robot |
|---|---|---|---|
| P01 | Heat transmitted from surrounding environment to link 1 | 43.1 W | 9.56 W |
| P02 | Heat transmitted from surrounding environment to link 2 | 34.38 W | −5.94 W |
| P03 | Heat transmitted from payload and surrounding environment to link 3 | 7.47 W | 7.45 W |
| P0S | Heat transmitted from surrounding environment to spindle housing | −16.85 | −77.7 W |
| P1SRJ | Heat transmitted from link 1 to spindle housing through rotary joint | 2.85 W | 11.1 W |
| P1STC | Heat transmitted from link 1 to spindle housing through thermal coupling | 82.1 W | N/A |
| P21RJ | Heat transmitted from link 2 to link 1 through rotary joint (W) | 0.90 W | 1.51 W |
| P21TC | Heat transmitted from link 2 to link 1 through thermal coupling | 41.0 W | N/A |
| P32RJ | Heat transmitted from link 3 to link 2 through rotary joint | 0.23 W | 7.45 W |
| P32TC | Heat transmitted from link 3 to link 2 through thermal coupling | 7.24 W | N/A |
| PSC | Heat transmitted from spindle housing to cooling medium | 568 W | 433 W |
| T1 | Temperature of link 1 (upper arm) | 59.1 deg C. | 178 deg C. |
| T2 | Temperature of link 2 (upper arm) | 79.7 deg C. | 213 deg C. |
| T31 | Temperature of first portion of link 3 | 385 deg C. | 385 deg C. |
| T32 | Temperature of second portion of link 3 | 85.2 deg C. | |
| TM | Temperature of spindle motors | 30.1 deg C. | 54.5 deg C. |
| TS | Temperature of spindle housing | 26.1 deg C. | 50.4 deg C. |

As indicated in comparing Table 1 with Table 2, the temperatures of the links of the example robot have been considerably reduced compared to the equivalent state-of-the-art conventional robot. In particular, the temperature of link 3 adjacent to the wrist joint (second portion of link 3) has been reduced from 385 deg C. to a manageable level of approximately 85 deg C., the temperature of link 2 has been reduced from 213 deg C. to approximately 80 deg C., and the temperature of link 1 has been reduced from 178 deg C. to approximately 60 deg C. This directly addresses challenges associated with excessive rise of the temperature of the components of the robot arm, including thermal expansion issues, reduced life of bearings, premature lubricant breakdown and thermal damage to active components, such as sensors and electronics, which may be integrated into the robot arm.

Figure 7A:
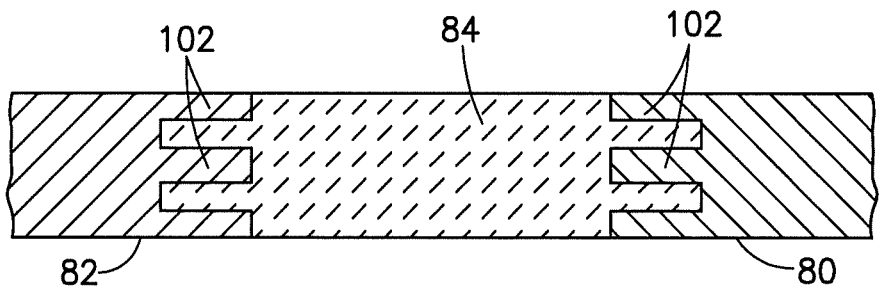
FIGS. 7A-7B are a schematic sectional view and top view of one example of a heat choke and connection of the heat choke to the third link of a robot arm.
Figure 7B:
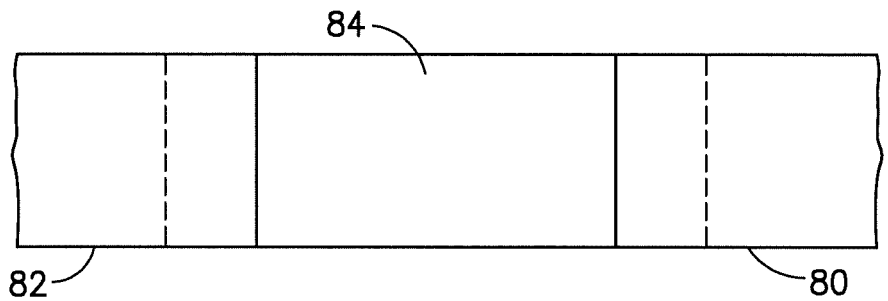
Figure 8A:
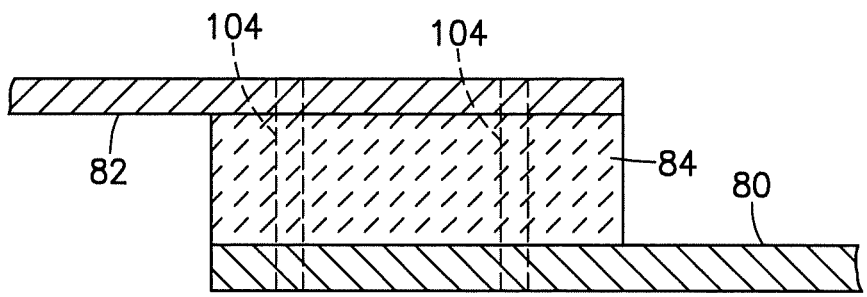
FIGS. 8A-8B are a schematic sectional view and top view of one example of a heat choke and connection of the heat choke to the third link of a robot arm.
Figure 8B:
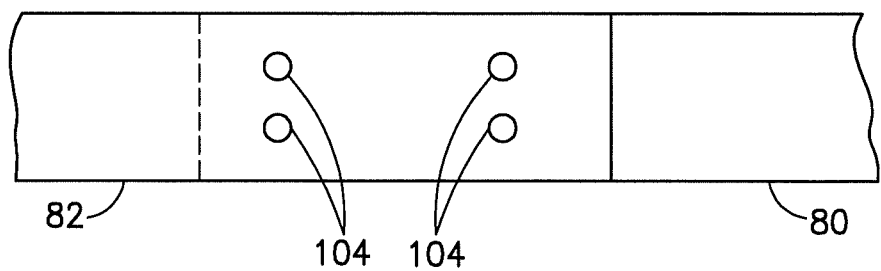

The size, shape and materials used in regard to the heat choke and the connections used with the first and second portions 80, 82 of the third link 70 may be suitably selected such as based upon the working environment for the robot such as the expected weight of the payload 72 and temperature of the payload and substrate processing chambers for example. Referring also to FIGS. 7A-7B, one example is shown where the heat choke comprises a refractory material with interleaved portions stationarily attached to fingers 100, 102 of the metal first and second portions 80, 82. FIG. 7A shows a cross sectional view and FIG. 7B shows a top view. The interlocking shapes may be used to bond the materials together, and the heat choke may be molded onto the first and second portions for example. Alternatively, or additionally, fasteners could be used. An example of use of fasteners is shown in FIGS. 8A and 8B where the heat choke is sandwiched between sections of the first and second portions, where the sections form top and bottom plates to the sandwich and fasteners 104 attach the layers together. The fasteners 104 may function as structural reinforcement between the two portions 80, 82 with direct contact, or not directly contact the two portions 80, 82.

Figure 9:
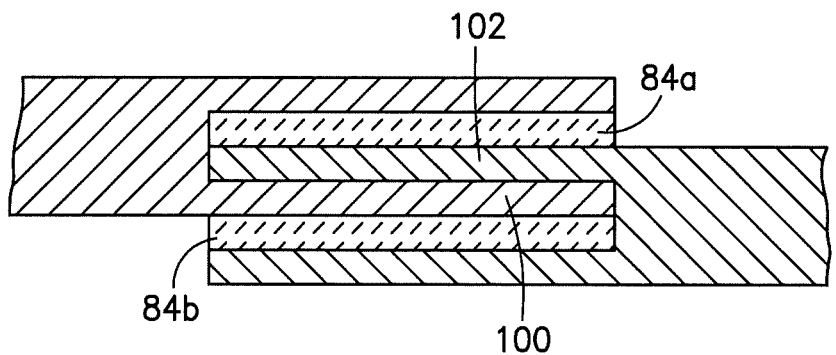
FIG. 9 is a schematic sectional view of a heat choke and connection of the heat choke to the third link of a robot arm.
Figure 10:
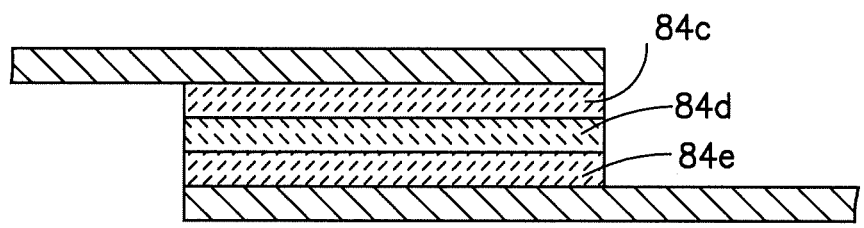
FIG. 10 is a schematic sectional view of a heat choke and connection of the heat choke to the third link of a robot arm.
Figure 11A:
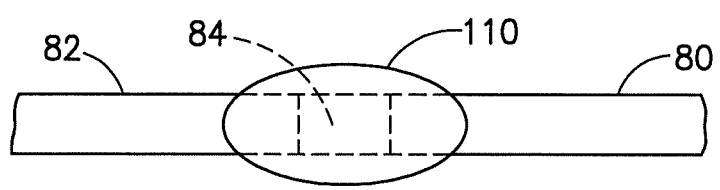
FIGS. 11A-11B are a top view and a schematic sectional view of one example of a heat choke and connection of the heat choke to the third link of a robot arm.
Figure 11B:
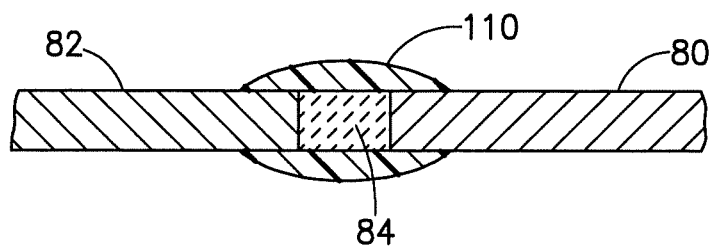

Referring also to FIG. 9, in this example two layers 84a, 84b of heat refractory material are used, and small thickness fingers 100, 102 of the metal first and second portions 80, 82 might directly contact one another merely for an increased structural integrity at the joint with the refractory material. Referring also to FIG. 10, in this example the heat choke has multiple layers 84c, 84d, 84e of different refractory material arranged in a sandwich type of arrangement between sections of the metal first and second portions 80, 82. FIGS. 11A-11B illustrate that a material 110, such as a high temperature epoxy for example, may be applied to the joint of the heat choke with the first and second portions to prevent outgassing of gases from adhesive or the refractory material, and prevent dust or pieces of the refractory material from flaking off of the link 70. In an alternate example, any suitable high temperature refractory material cover could be provided on the joint, and the refractory material may be at least partially located inside one or both of the first and second portions.

Although the above examples describe features with respect to a three-link robot arm with rotary joints, a robot comprising features as described herein may utilize any suitable arm mechanism including, but not limited to, various serial and parallel mechanisms, and the robot arm mechanism may employ various mechanical couplings including, but not limited to, rotary, prismatic and spherical joints. Furthermore, although a robot with a single robot arm is considered in the above examples, the robot may feature more than one arm.

Features as described herein may be used to address negative effects of heat emanating from the payload carried by the robot arm and from the surroundings of the robot arm. The heat received by the robot arm, if not removed by a suitable cooling arrangement, may result in excessive rise of the temperature of the components of the robot arm, which in turn may lead to thermal expansion issues, reduced life of bearings, premature lubricant breakdown and thermal damage to active components, such as sensors and electronics, which may be integrated into the robot arm. The mechanism of cooling of the robot arm is particularly challenging in vacuum-environment applications where conduction and convention phenomena are very limited, or do not exist at all, and where internal forced air or liquid cooling of the robot arm may not be a practical option. Features as described herein may be used to provide a solution that can be applied even under these challenging circumstances.

An example embodiment may be provided with an apparatus comprising a robot drive; and an arm connected to the robot drive, where the arm comprises a first link connected to the robot drive, a second link rotatably connected to the first link at a first rotatable connection, and an end effector rotatably connected to the second link at a second rotatable connection, where the end effector comprises a heat choke located between a substrate support area of the end effector and the second rotatable connection, and where at least one of the first rotatable connector or the second rotatable connection comprises a rotary thermal coupling having interleaved members which are rotatable relative to each other.

Figure 12:
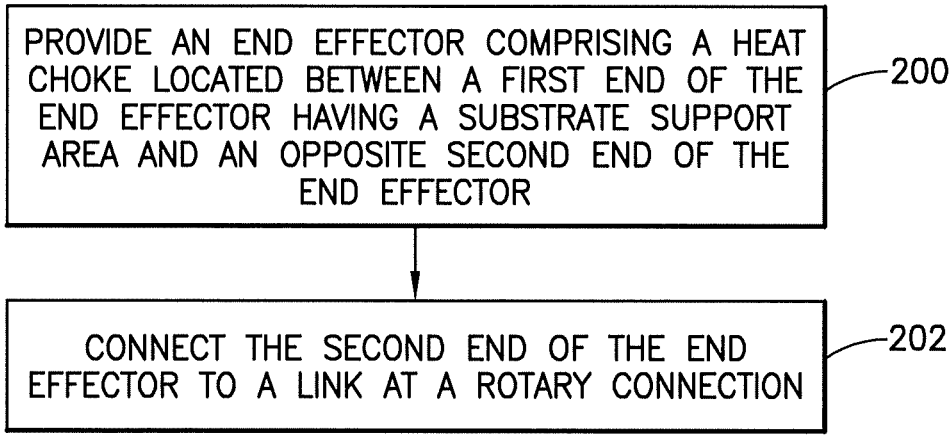
FIG. 12 is a block diagram illustrating some steps of an example method.

The robot drive may comprise a drive housing and a spindle assembly movably located in the drive housing, where the spindle assembly comprises coaxial drive shafts and motors connected to the drive shafts. The apparatus may comprise a first rotary thermal coupling located at an outer one of the coaxial drive shafts. The rotary thermal coupling may comprise a second rotary thermal coupling located at the first rotatable connection and a third rotary coupling at the second rotatable connection. The robot arm may comprise pulleys and bands configured to rotate the second link and the end effector at the first and second rotatable connections. The first rotatable connector may comprise a first rotary thermal coupling having first interleaved members, where the first interleaved members are rotatable relative to each other about an axis of rotation of the first rotatable connector. The second rotatable connector may comprise a second rotary thermal coupling having second interleaved members, where the second interleaved members are rotatable relative to each other about an axis of rotation of the second rotatable connector. The heat choke may comprise a refractory material connecting a first portion of the end effector to a second portion of the end effector. The heat choke may space the first portion from the second portion. The heat choke may comprise sections interleaved with sections of the first and/or second portions of the end effector. The end effector may comprise an encasing material surrounding a connection of the heat choke the first and second portions of the end effector. The heat choke may comprise layers of different material. The robot arm may comprise at least one heat pipe having opposite ends thermally connected to at least one of the link of the robot arm and/or to a rotary thermal couplings of the robot arm Referring also to FIG. 12, an example method may be provided comprising: providing, as indicated by block 200, an end effector comprising a heat choke located between a first end of the end effector having a substrate support area and an opposite second end of the end effector; and connecting the second end of the end effector to a link at a rotary connection, as indicated by block 202, where the link and the end effector are configured to at least partially form an arm of substrate transport robot, where the connecting of the second end of the end effector to the link comprises providing a rotary thermal coupling having interleaved members which are rotatable relative to each other at the rotary connection.

Figure 13:
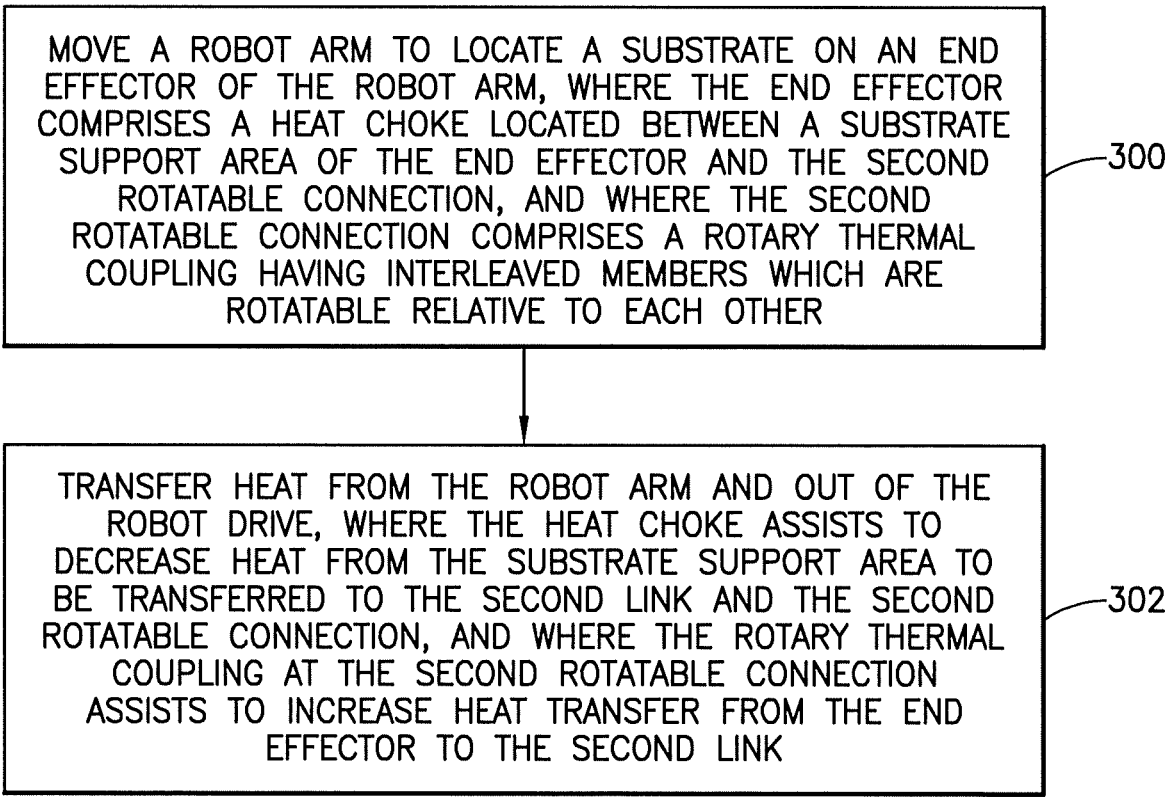
FIG. 13 is a block diagram illustrating some steps of an example method.

Referring also to FIG. 13, an example method may be provided comprising: moving a robot arm to locate a substrate on an end effector of the robot arm, as indicated by block 300, where the robot arm comprises a first link connected to a robot drive, a second link rotatably connected to the first link at a first rotatable connection, and the end effector rotatably connected to the second link at a second rotatable connection, where the end effector comprises a heat choke located between a substrate support area of the end effector and the second rotatable connection, and where the second rotatable connection comprises a rotary thermal coupling having interleaved members which are rotatable relative to each other; and transferring heat from the robot arm and out of the robot drive, as indicated by block 302, where the heat choke assists to decrease heat from the substrate support area to be transferred to the second link and the second rotatable connection, and where the rotary thermal coupling at the second rotatable connection assists to increase heat transfer from the end effector to the second link. The first rotatable connection may comprise a first rotary thermal coupling having interleaved members which are rotatable relative to each other, and where the transferring of the heat from the robot arm and out of the robot drive comprises the first rotary thermal coupling at the first rotatable connection assisting to increase heat transfer from the second link to the first link.

Figure 14:
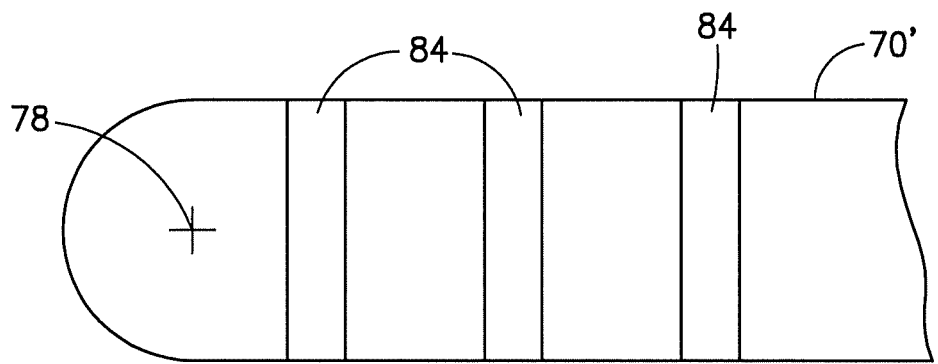
FIG. 14 is a top plan view illustrating an example construction of multiple heat chokes with an arm link.
Figure 15:
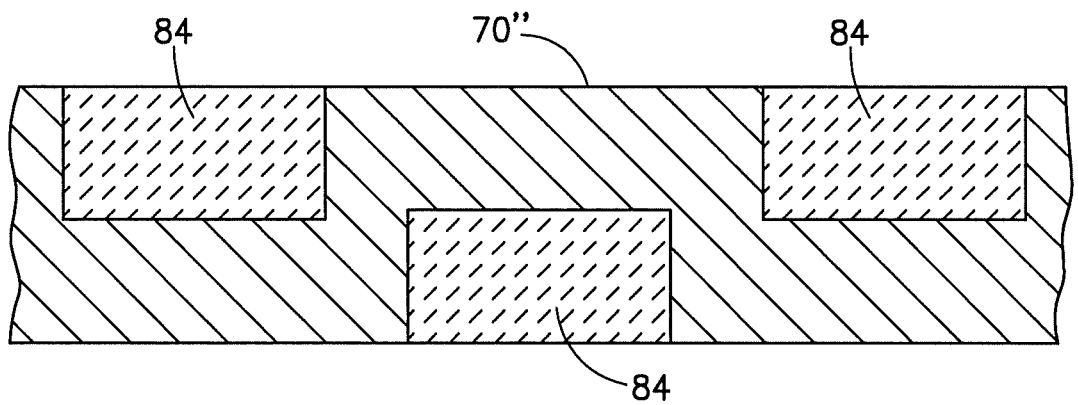
FIG. 15 is a sectional view illustrating an example construction of multiple heat chokes with an arm link.
Figure 16:
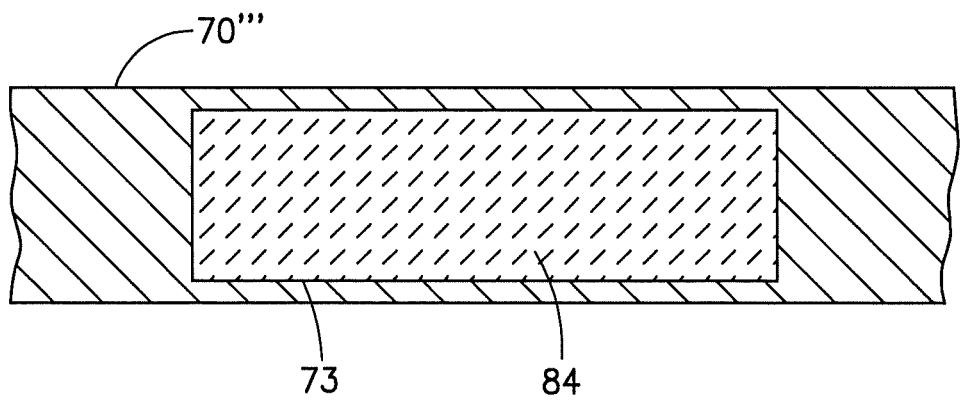
FIG. 16 is a sectional view illustrating an example construction of a heat choke inside a frame member of an arm link.
Figure 17:
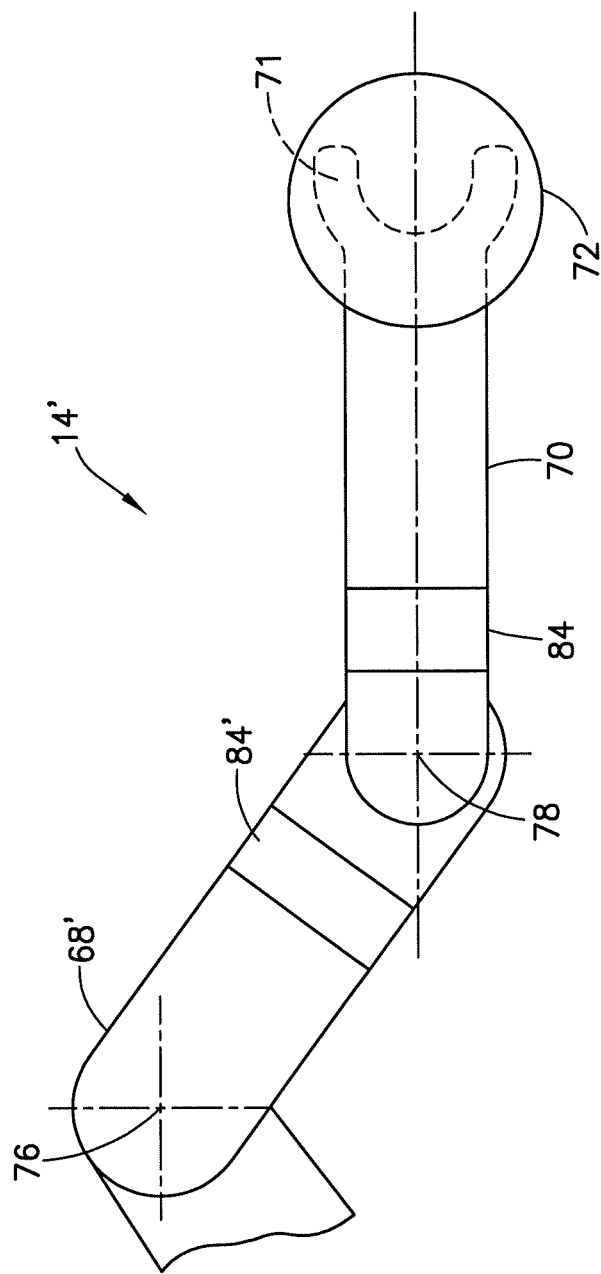
FIG. 17 is a top plan view illustrating location of multiple heat chokes in multiple arm links.

Additional alternative examples regarding a heat choke are shown in FIGS. 14-17. FIG. 14 illustrates that multiple heat chokes may be provided at different lengths along the link 70'. These may also comprise one or more different refractory materials, and one or more different sizes and shapes. FIG. 15 illustrates that multiple heat refractory members could be inserted into pockets inside a single metal member; perhaps from different sides such as top and bottom or left and right. The link 70" may have a single metal frame member with a lattice shape or multiple pocket shape to receive members 84 or have the members 84 molded or formed therein. FIG. 16 illustrates that a one-piece frame member of the link 70'" may have a closed or substantially closed pocket 73 which received the member 84. The opening to the pocket 73 could be closed after assembly by any suitable means such as an attached door, hatch or other cover. FIG. 17 illustrates that the arm 14' could have more than one heat choke in more than one link. In FIG. 17 the third link 70 has the heat choke 84 closer to the rotary joint 78 than the substrate support area 71 (closer to the rear of the link 70 than the front of the link 70), and the second link 68' has the heat choke 84' closer to the rotary joint 78 than the rotary joint 76 (closer to the front of the link 68' than the rear of the link 68'). Thus, more than one link may be provided with a heat choke, and the location of the heat chokes on the links may be any suitable longitudinal length location; perhaps different or perhaps the same.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus, comprising:
   a robot drive; and
   a robot arm connected to the robot drive, where the robot arm comprises,
      a first link connected to the robot drive,
      a second link rotatably connected to the first link at a first rotatable connection, and
      an end effector rotatably connected to the second link at a second rotatable connection, where the end effector comprises,
         a thermally resistive heat choke coupling a substrate support area of the end effector and the second rotatable connection, the thermally resistive heat choke comprising a body, at least one first protrusion at a first side of the body, and at least one second protrusion at a second side of the body, the at least one first protrusion and the at least one second protrusion being interleaved with corresponding receiving portions at the substrate support area and the second rotatable connection, respectively, the thermally resistive heat choke comprising a material having a resistance configured to control a transfer of heat from a first portion of the end effector to a second portion of the end effector, and
      where at least one of the first rotatable connection or the second rotatable connection comprises a rotary thermal coupling having interleaved members which are rotatable relative to each other.

2. The apparatus as claimed in claim 1 where the robot drive comprises a drive housing and a spindle assembly movably located in the drive housing, where the spindle assembly comprises coaxial drive shafts and motors connected to the drive shafts.

3. The apparatus as claimed in claim 2 where the apparatus comprises the first rotary thermal coupling located at an outer one of the coaxial drive shafts.

4. The apparatus as claimed in claim 3 where the rotary thermal coupling comprises a second rotary thermal coupling located at the first rotatable connection and a third rotary coupling at the second rotatable connection.

5. The apparatus as claimed in claim 1 where the robot arm comprises pulleys and bands configured to rotate the second link and the end effector at the first and second rotatable connections.

6. The apparatus as claimed in claim 5 where the first rotatable connection comprises a first rotary thermal coupling having first interleaved members, where the first interleaved members are rotatable relative to each other about an axis of rotation of the first rotatable connection.

7. The apparatus as claimed in claim 6 where the second rotatable connection comprises a second rotary thermal coupling having second interleaved members, where the second interleaved members are rotatable relative to each other about an axis of rotation of the second rotatable connection.

8. The apparatus as claimed in claim 1 where the heat choke comprises a refractory material connecting a first portion of the end effector to a second portion of the end effector.

9. The apparatus as claimed in claim 8 where the heat choke spaces the first portion from the second portion.

10. The apparatus as claimed in claim 8 where the heat choke comprises sections interleaved with sections of at least one of the first portion or the second portion of the end effector.

11. The apparatus as claimed in claim 1 further comprising at least one heat pipe having opposite ends thermally connected to at least one of the link of the robot arm or to the rotary thermal coupling of the robot arm.

12. An apparatus, comprising:
   a robot drive; and
   a robot arm connected to the robot drive, where the robot arm comprises a first link connected to the robot drive, a second link rotatably connected to the first link at a first rotatable connection, and at least one third link rotatably connected to the second link at at least one second rotatable connection, where the at least one third link comprises a thermally resistive heat choke coupling a substrate support area of the at least one third link and the second rotatable connection, the thermally resistive heat choke comprising a body, at least one first protrusion at a first side of the body, and at least one second protrusion at a second side of the body, the at least one first protrusion and the at least one second protrusion being interleaved with corresponding receiving portions at the substrate support area of the at least one third link and the second rotatable connection, respectively, the thermally resistive heat choke comprising a material having a resistance configured to control a transfer of heat between the substrate support area and the second rotatable connection, and where at least one of the first rotatable connection or the second rotatable connection comprises a rotary thermal coupling having interleaved members which are rotatable relative to each other.

13. The apparatus as claimed in claim 12 further comprising at least one heat pipe having opposite ends thermally connected to at least one of the links of the robot arm or to the rotary thermal coupling of the robot arm.

14. A method, comprising:
   providing an end effector comprising a thermally resistive heat choke coupling a first end of the end effector having a substrate support area and an opposite second end of the end effector, the thermally resistive heat choke comprising a body, at least one first protrusion at a first side of the body, and at least one second protrusion at a second side of the body, the at least one first protrusion and the at least one second protrusion being interleaved with corresponding receiving portions at the substrate support area and the opposite second end of the end effector, respectively, the thermally resistive heat choke comprising a material having a resistance configured to control a transfer of heat between the first end of the end effector and the opposite second end of the end effector;
   connecting the second end of the end effector to a link at a rotary connection, where the link and the end effector are configured to at least partially form an arm of substrate transport robot, where the connecting of the second end of the end effector to the link comprises providing a rotary thermal coupling having interleaved members which are rotatable relative to each other at the rotary connection.

15. A method comprising:

moving a robot arm to locate a substrate on an end effector of the robot arm, where the robot arm comprises a first link connected to a robot drive, a second link rotatably connected to the first link at a first rotatable connection, and the end effector rotatably connected to the second link at a second rotatable connection, where the end effector comprises a thermally resistive heat choke coupling a substrate support area of the end effector and the second rotatable connection, the thermally resistive heat choke comprising a body, at least one first protrusion at a first side of the body, and at least one second protrusion at a second side of the body, the at least one first protrusion and the at least one second protrusion being interleaved with corresponding receiving portions at the substrate support area of the end effector and the second rotatable connection, respectively, the thermally resistive heat choke comprising a material having a resistance configured to control a transfer of heat between the end effector and the second rotatable connection, and where the second rotatable connection comprises a rotary thermal coupling having interleaved members which are rotatable relative to each other; and transferring heat from the robot arm and out of the robot drive, where the heat choke assists to decrease heat from the substrate support area to be transferred to the second link and the second rotatable connection, and where the rotary thermal coupling at the second rotatable connection assists to increase heat transfer from the end effector to the second link.

16. The method as in claim 15 where the first rotatable connection comprises a first rotary thermal coupling having interleaved members which are rotatable relative to each other, and where the transferring of the heat from the robot arm and out of the robot drive comprises the first rotary thermal coupling at the first rotatable connection assisting to increase heat transfer from the second link to the first link.

* * * * *